July 13, 1954    F. F. SUELLENTROP    2,683,558
APPARATUS FOR MANUFACTURING WHIPPED CREAM
Filed Nov. 8, 1952    4 Sheets-Sheet 1
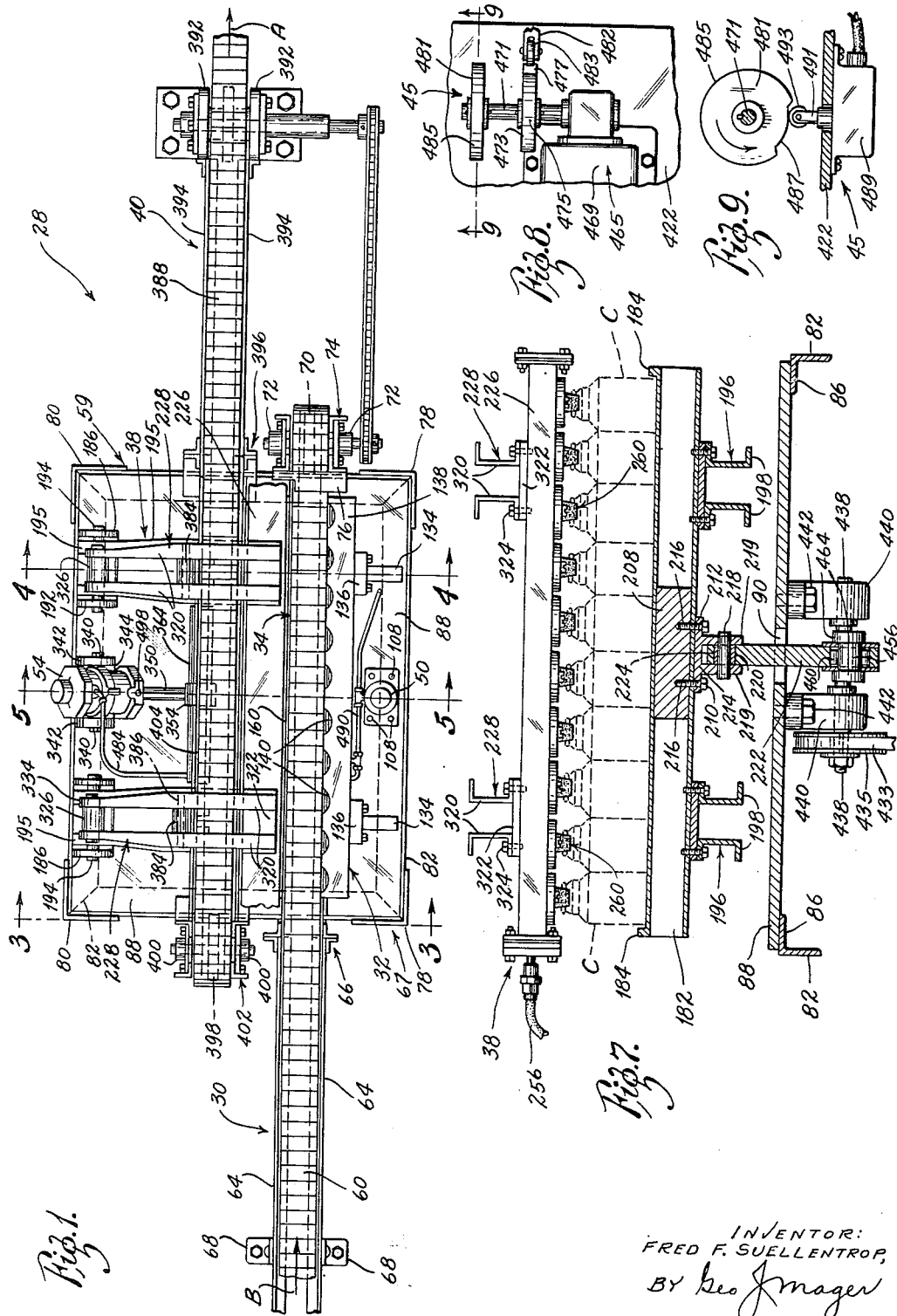
INVENTOR:
FRED F. SUELLENTROP,
BY Geo J Mager
HIS ATTORNEY July 13, 1954

F. F. SUELLENTROP 2,683,558

APPARATUS FOR MANUFACTURING WHIPPED CREAM

Filed Nov. 8, 1952

INVENTOR:
FRED F. SUELLENTROP,
BY Geo J Mager
HIS ATTORNEY

July 13, 1954     F. F. SUELLENTROP     2,683,558
APPARATUS FOR MANUFACTURING WHIPPED CREAM
Filed Nov. 8, 1952                                       4 Sheets-Sheet 3

INVENTOR:
FRED F. SUELLENTROP,
BY Geo Imager
HIS ATTORNEY

July 13, 1954  F. F. SUELLENTROP  2,683,558
APPARATUS FOR MANUFACTURING WHIPPED CREAM
Filed Nov. 8, 1952  4 Sheets-Sheet 4
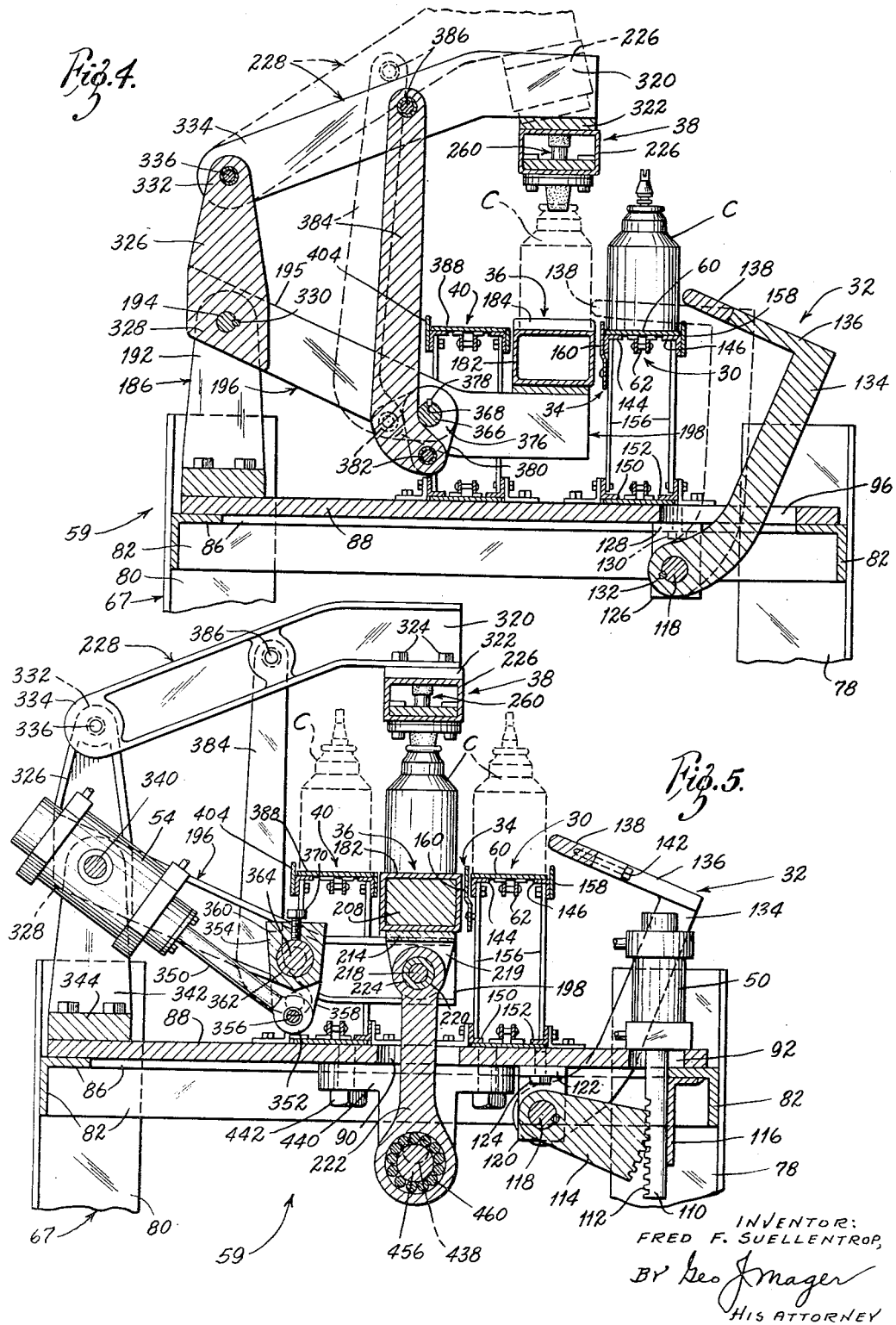
INVENTOR:
FRED F. SUELLENTROP,
BY Geo J Mager
HIS ATTORNEY Patented July 13, 1954

2,683,558

UNITED STATES PATENT OFFICE 2,683,558

APPARATUS FOR MANUFACTURING WHIPPED CREAM

Fred F. Suellentrop, Lemay, Mo., assignor to Lemay Machine Company, Lemay, Mo., a corporation of Missouri Application November 8, 1952, Serial No. 319,552

3 Claims. (Cl. 226—72)

The present invention relates generally to the manufacture of whipped cream in handy containers designed primarily for domestic purposes. That is to say, the invention is directed to apparatus for fluffing or whipping a quantity of pasteurized cream within each of a plurality of self-dispensing containers, simultaneously with the introduction into each container of a gas under specified pressure, as will appear.

In United States Letters Patent No. 2,584,063, issued to me on January 29, 1952, entitled Apparatus for Manufacturing Whipped Cream, there is set forth in detail a description of the method, and an apparatus employed in practicing the method.

The present invention contemplates no critical change in the method set forth in said patent, and is directed solely to improvements in the container-reciprocating and gas-injecting apparatus employed.

Specifically, the present invention is directed to improvements in the apparatus disclosed in United States Letters Patent No. 2,594,492, likewise entitled Apparatus for Manufacturing Whipped Cream, granted jointly on April 29, 1952, to Norman J. Pfeiffer and to me.

Broadly, the apparatus disclosed in said patent includes a first continuously operating conveyor for delivering cream containers to a machine; means for transferring a plurality of the containers from said conveyor onto a vertically reciprocable bed member; a retractible barrier strip or container guide, normally positioned between the adjacent edge portions of said conveyor and said bed member; a gas injection assembly adapted to releasably maintain the containers in place during the gas injection and simultaneous reciprocation thereof; a second continuously operating conveyor for transporting or discharging processed containers from the machine; means for transferring processed containers from said bed onto the said discharge conveyor; and means for effecting the various operations sequentially, continuously, and automatically.

As said patent describes in detail, the bed member onto which containers are first loaded is thereafter reciprocated vertically and rapidly for approximately twenty-five seconds. Thereupon said bed member automatically comes to rest, the processed cans are displaced and transferred to a discharge conveyor, the bed member is reloaded, and then automatically reciprocated as before. These operations are controlled by a clutch mechanism which is responsive to the action of an air cylinder, the latter being in turn controlled by a master air valve in conjunction with a metering valve, all as clearly explained in said patent.

Because the demand for the ultimate product is very great, the disclosed apparatus is now in continuous operation at many dairies. However, since when the apparatus is in operation, approximately four clutch operations per minute are required, the resulting clutch wear and occasional clutch malfunctioning has been found very undesirable, as is understood.

The primary object of the present invention therefore is to provide means, in lieu of the said clutch mechanism and its associated elements, for controlling the action of the bed member without requiring any other change whatsoever in the patented apparatus, or in the functioning thereof, as will appear.

The containers in which the cream is processed are of the same type described but not claimed in the patents previously referred to, and in the accompanying drawings, the same reference characters have been applied to parts which are common to said joint patent and to the present disclosure.

In said drawings:

Figure 1 is a top plan view of the apparatus comprising the present invention, the end portions of a gas injection manifold being broken away to more clearly present the structure therebelow;

Figure 2 is a front elevational view thereof;

Figure 4 is a vertical sectional view on a further enlarged scale taken approximately on the line 4—4 of Figure 1;

Figure 5 is a similar view taken approximately on the line 5—5 of Figure 1;

Figure 7 is a view partly in elevation and partly in vertical section, said view being taken along the line 7—7 of Figure 3, with elements which would appear in the background being omitted in the interest of clarity;

Figure 8 is a fragmentary detail plan view on an enlarged scale, of a micro-switch operating cam and a master air-valve operating cam, both cams being mounted on the output shaft of a variable speed transmission unit, the location of the illustrated elements being indicated by the line 8—8 in Figure 2;

Figure 9 is a vertical sectional view taken approximately on the line 9—9 of Figure 8;

Figure 10 is a diagrammatic layout of the automatic air control system which is incorporated in the apparatus;

Figure 11 is a wiring diagram.

Figure 3:
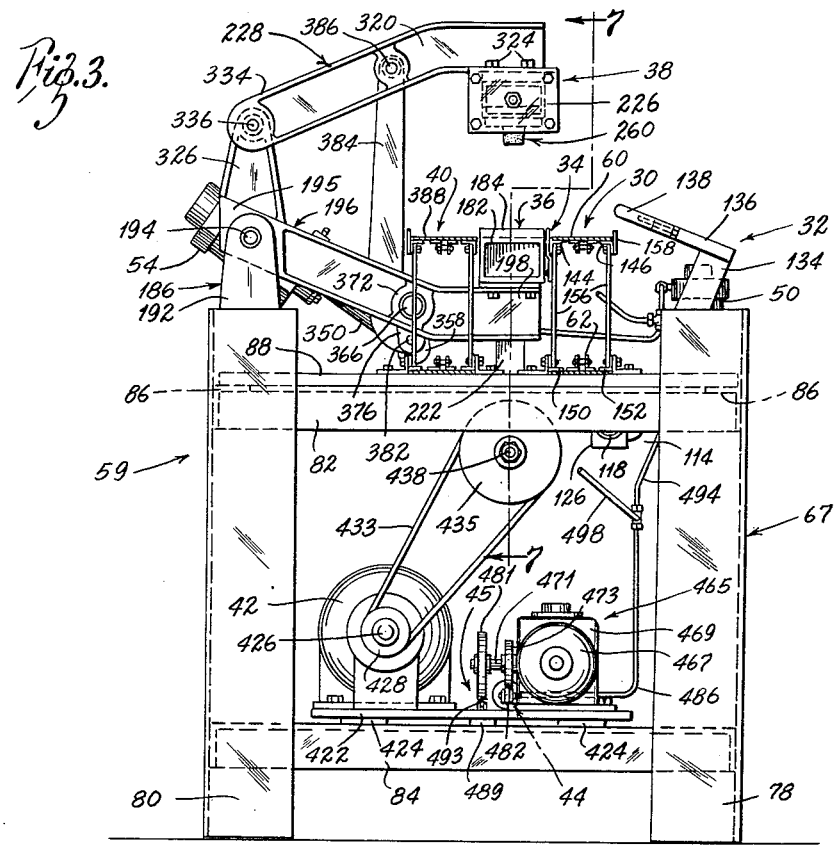
Figure 3 is a left end elevational view, partly in section, and on an enlarged scale, being taken as indicated, approximately on the line 3—3 of Figure 1.

In Figures 1 and 2, the apparatus comprising the instant invention is designated as a whole by the numeral 28. It is designed to be interposed between the mechanism employed to introduce a predetermined quantity of cream into the containers, and a cold storage room or the like.

The apparatus 28 includes delivery conveyor mechanism generally indicated at 30; container transfer or loading mechanism generally indicated at 32; retractible container guide mechanism generally indicated at 34; a reciprocable container-supporting bed assembly generally indicated at 36; a gas injection assembly, also reciprocable and generally indicated by numeral 38; discharge conveyor mechanism generally indicated by numeral 40; a motor 42; a cam operated master air control valve assembly generally indicated at 44; a cam operated microswitch assembly generally indicated at 45; an air pressure operated cylinder 50 associated with said transfer mechanism; an air pressure operated cylinder 52 associated with said container guide mechanism; an air pressure operated cylinder 54 associated with said gas injection assembly; a shut-off valve 56; a gas pressure regulator 58; driving connections, supporting structure, and other elements and parts to be described.

As set forth in detail in the first named patent aforesaid, a predetermined quantity of high quality pasteurized cream is first introduced into each container, whereupon the latter has affixed thereto a valve assembly of the type also described. The containers may now be delivered from the filling station to the processing machine to be described, which incorporates the principal mechanism of the invention, and which is generally indicated by the numeral 59.

The delivery mechanism 30 is generally of conventional construction. It includes a plate type endless conveyor 60, provided on its underside with an endless chain 62, and is supported intermediate the filling station and said machine on angle guides 64. Suitable structure, generally indicated at 66, and welded or otherwise rigidly secured to the framework 67 of said machine, supports the end of said angles, and one or more standards 68 may be employed to support the angles at intervals between the filling station and the machine, as shown.

The conveyor 60, as appears for example in Figures 2 and 3, is horizontally disposed, and travels longitudinally across the machine 59 and then around a sprocket wheel 70, rotatably mounted in bearings 72, the latter supported in suitable structure 74, welded or otherwise rigidly secured to the framework 67. As shown in Figure 1, an abutment or can stop member 76 is provided, which extends across the conveyor in vertical spaced relation thereto, for a reason to appear.

The framework 67 of the machine 59, includes a pair of front corner standards 78 and a pair of rear corner standards 80 secured together by front, rear, and side angle rails 82 near their upper ends, and by similar angle rails 84 near their lower ends. The standards 78 and 80 are also of angular cross-section, and all of the structural members named are welded together to provide the rigid skeleton framework 67, which as shown, supports all of the mechanism included in the machine 59, as well as the delivery conveyor supporting assemblies 66, 74, and similar assemblies for the discharge conveyor, as will appear.

Figure 6:
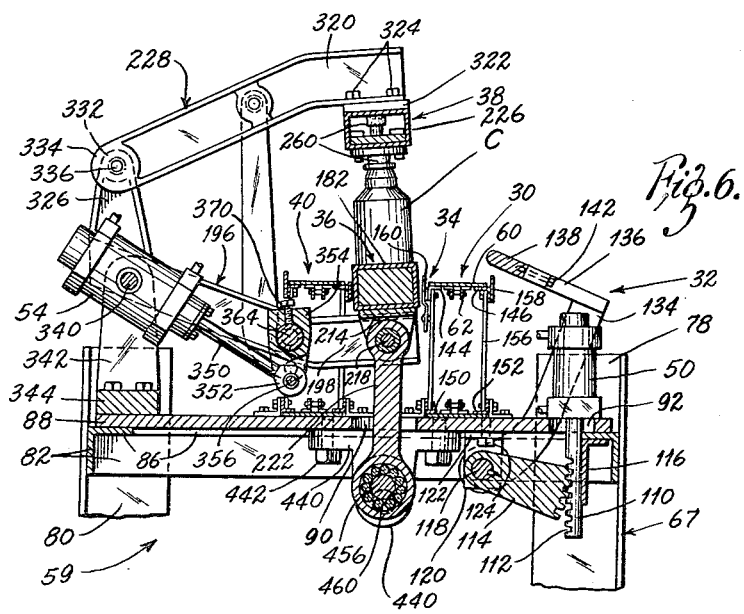
Figure 6 is a view similar to Figure 5 with certain parts in an alternate position, the scale corresponding to that of Figure 3.

Supported on, and welded to the inturned flange portions 86 of the upper angle rails is a rectangular base plate 88. On the transverse center line and approximately centrally of said plate, there is provided a relatively large circular opening 90, and adjacent the front margin of the plate, a small opening 92 as best seen in Figures 5 and 6. Also formed in said plate, are a pair of spaced elongated slots 96, one of which is portrayed particularly in Figure 4.

The loading mechanism 32 includes the air cylinder 50 which, as shown particularly in Figure 1, is mounted on plate 88 by means of bolts 108. The air cylinder 50 is of conventional design, and includes a vertically reciprocable piston not shown, and a depending piston rod 110, the latter as seen in Figure 5, extending freely through opening 92 of said base plate 88.

A rack 112 formed in said piston rod, is maintained in constant engagement with a segmental gear 114 by means of an angular bracket 116, rigidly secured as by welding or otherwise, to flange 86 of front rail 82. Segmental gear 114 is keyed to a horizontal rock shaft 118 between the depending leg portions 120 of an inverted U-shaped bearing member 122, which rotatably supports said shaft, and which is rigidly mounted on the underside of the plate 88 by means of tap bolts 124.

Each end portion of shaft 118 is rotatably supported in the depending leg portion 126 of an angular bearing member 128, the latter rigidly mounted on the underside of plate 88 by means of tap bolts 130. Rigidly secured to the rock shaft 118, as by keys 132 or otherwise, is a pair of longitudinally spaced rocker arms 134 each terminating at its free end in a rearwardly projecting flange portion 136, the configuration of which will be apparent from an inspection of Figures 1 and 3. As best seen in Figure 4, each arm 134 extends through one of the elongated slots 96 in base plate 88, and normally occupies the position portrayed in said view.

The machine 59 illustrated, is designed to simultaneously process ten containers, so that a loading bar 138 is provided, having ten arcuately formed and equally spaced recesses 140, each adapted to engage a peripheral portion of one container C, as will appear. The bar 138 is supported by the arms 134, being secured to the flange portions 136 of the latter by cap screws 142 as shown, or otherwise.

From the foregoing, it should be manifest that the rock shaft 118, rotatably supported in the central bearing member 122 and the end bearing members 128, can shift the loading bar 138 from its Figure 5 full line position to the broken line position thereof shown in Figure 4, whenever piston rod 110 is raised.

As hereinbefore noted, delivery conveyor 60 travels across the machine 59 in a horizontal plane, and means are provided to support the upper stretch thereof between the supporting structure 66 and the sprocket 70, mounted in supporting structure 74.

Included in the means referred to, is a pair of transversely spaced angle rails 144 and 146. On the upper surfaces of the horizontally disposed flanges of these rails, the plates of conveyor 60 are slidably supported as shown in Figures 5, 6, and other views. The rails 144 and 146 are preferably coextensive longitudinally from the left to the right end of said machine, so that the upper stretch of conveyor 60 is definitely maintained in a horizontal plane.

After the upper stretch of said conveyor has travelled around sprocket 70, it becomes the lower stretch as is understood. As such, it slides along the upper surface of plate 88, and beneath the lower surfaces of the horizontally disposed flanges of angle rails 150 and 152. These rails are also preferably coextensive longitudinally from the left to the right end of machine 59, and are rigidly mounted on the base plate, as shown.

As illustrated in the drawings, the angle rails 144 and 146 are supported in position by a plurality of perpendicular struts 156, the upper ends of which are welded or secured as shown to said rails, and the lower ends of which are similarly secured to the rails 150 and 152. Welded, or otherwise permanently attached to front rail 146, is a guide or retainer plate 158, the upper end of which projects above the plane of the plate conveyor 60, so that the containers C are maintained in alignment, as is understood. The retractible container guide mechanism 34, mounted on the rear struts 156, serves the same purpose along the opposite or rear edge of said conveyor.

The mechanism 34 is not illustrated or described herein in detail, being identical with that disclosed in the joint patent. It includes a vertically movable guide plate 160, the aforesaid air cylinder 52; a piston rod 164 operable by said cylinder; a head 166 rigid with the outer end of said piston rod; and a link 168 pivotally connected at one end to said head, and at the other to said guide plate, whereby the latter may be raised and lowered.

The assembly 36 supports a plurality of containers C immediately prior to, during, and immediately subsequently to a processing cycle. The bed member of this assembly is in the form of a rectangular tube 182 provided at either end with an upwardly projecting abutment 184, which may be integral therewith as shown.

Mounted adjacent the rear marginal edge of base 88, is a pair of spaced U-shaped bearing brackets 186. Pivotally mounted between the upstanding leg portions 192 of said brackets, on horizontally disposed pivots 194, are the rear end portions 195 of a pair of composite arms 196, the free end portions 198 of which are normally horizontal, and are disposed beneath the container supporting bed 182.

In order to reinforce the tube 182, a preferably solid block 208 is inserted thereinto and maintained in position centrally thereof, by cap screws 210 which pass through the lateral flanges 212 of a wrist pin connection 214, through the bottom wall of said tube, and thence into engagement with threaded apertures 216 provided in said block, as is clearly illustrated in Figure 7.

Numeral 218 designates a wrist pin, pressfitted as shown, or otherwise permanently mounted in the spaced depending portions 219 of said member 214. Pin 218 passes through a circular opening 220 provided in the upper end portion of a connecting rod 222 which is reciprocable vertically as will appear, and which projects downwardly through opening 90 in the base plate 88. Needle bearings are preferably interposed about the wrist pin in the opening 220, although because of illustrative limitations, a bearing sleeve 224 is shown.

The gas injection assembly 38 includes a manifold 226, secured to the free ends of a pair of horizontally spaced composite arms each generally designated 228. It is not considered necessary to describe the manifold 226 in detail herein, since its construction and operation is fully set forth in said joint patent. It is sealed at both ends, and gas under pressure of ninety pounds per square inch is supplied thereto from a source of supply via flexible conduit 256. The manifold carries a plurality of ten spaced injection nozzle assemblies generally designated 260, and means are provided to seal the manifold against leakage of gas about these assemblies also.

With particular reference now to Figures 1, 2, and 7, each of the arms 228 comprises a pair of spaced similar channel-shaped members 320, each pair being rigidly connected together by means of a plate 322, and tap screws 324 which engage threaded apertures provided in the top wall 316 of the manifold. With these arrangements, it should be apparent that the manifold 226 is rigidly secured to and supported by the free end portions of arms 228.

With reference especially now to Figures 3 through 6, numerals 326 designate a pair of vertically disposed links of the configuration shown. The lower portion 328 of each link is disposed between, and embraced by, a pair of rear end portions 195 of the arms 196 included in assembly 36. Pivot pin 194 also passes through said link, and the latter and said arms are rigidly secured together by any suitable means, a key 330 being illustrated. The upper ends 332 of said links are each disposed between and in contact with the rear end portions 334 of the pair of arms 228, a pivot pin 336 passing through said link and said arms.

The mechanism for alternately effecting the rise and descent of the gas injection assembly 38, is operable by air cylinder 54. As appears to best advantage in Figures 1, 5, and 6, said cylinder is rotatably mounted by means of trunnions 340, which project from opposite sides thereof and are supported in the upstanding leg portions 342 of a U-shaped bracket 344, which is attached to base plate 88 by means of tap bolts. Air cylinder 54 is of conventional design, and includes a piston which is not shown, and a projecting piston rod 350. To the free extremity of said rod, there is welded or otherwise rigidly secured an eye or bearing member 352, which has a pivotal connection with a clevis 354.

The connection referred to comprises a pivot pin 356 passing through said eye member and having its opposite ends secured in the depending leg portions 358 of said clevis. The body portion 360 of the clevis is undercut as shown, to accommodate reciprocal movements of the eye 352, and is provided with a horizontal bore 362 adapted to snugly receive the central portion of a horizontally disposed rock shaft 364. Said rock shaft includes end portions 366 the diameters of which are reduced relative to the intermediate portion, and are provided with keyways 368 for a purpose to appear. The clevis 354 is rigidly secured to the rock shaft by a set screw 370. Each of the aforesaid composite arms 196 is provided with a boss portion 372, and these serve as bearings for the reduced ends 366 of the rock shaft, as best seen in Figure 3.

Adjacent each arm 196, there is a link 376 secured by a key 378 which engages the keyway 368 in the rock shaft and a complementary keyway in the link. The depending free end 380 of each link, has a pivotal connection 382 with the lower end of a vertically disposed lever 384, of the configuration best seen in Figures 1 and 4. There are two levers 384, and each of them also has a pivotal connection 386 at its upper end with one of the composite arms 228.

The discharge mechanism 40 is of conventional construction. It includes a plate type endless conveyor 388, provided on its underside with an endless chain 390, and is supported intermediate a pair of standards 392 and the machine 59, by angle guides or the like 394. Suitable structure, generally designated 396, supports the left ends of said angles as shown in Figure 1. The conveyor 388, as appears for example in Figures 1 and 3, is horizontally disposed, and travels longitudinally across machine 59 after passing around a sprocket wheel 398, rotatably mounted in bearings 400, the latter supported in suitable structure 402, welded or otherwise rigidly secured to framework 67.

It is noted that the supporting structure for the discharge conveyor, as it travels longitudinally across the machine 59, is similar to that which supports the delivery conveyor. A guide plate which corresponds to guide plate 158, and serves as an abutment to maintain in alignment on conveyor 388, the processed containers C transferred onto said conveyor in the manner to be described further on, is designated 404. The conveyor 388 is driven by any suitable motive means provided at the discharge end thereof in the direction indicated by the arrow A, and the conveyor 60 is driven in the same direction as indicated by the arrow B in Figure 1.

Motor 42 is mounted on a suitable platform 422 supported on flat bars 424, the latter welded or otherwise secured to the horizontal flanges of the end angle rails 84. Rigidly attached to the motor shaft 426 is a pulley 428, having a driving connection 433 with a pulley 435 as best seen in Figure 3. The pulley 435 is rigidly affixed to a shaft 438 supported in spaced hanger bearings 440. These bearings are mounted on the underside of the base plate 88 by means of bolts 442.

Intermediate the bearing hangers 440, shaft 438 has formed thereon an eccentric or crank pin portion 456, which passes through a circular opening in the bottom end of connecting rod 222. An annular series of small roller bearings 460 is provided, the bearings being maintained in place by suitable retainer discs interposed between the end faces of the connecting rod, and annular shoulder portions 464 integrally formed on the shaft 438.

Reverting now to Figures 2 and 3, a combined speed reducer and transmission device generally designated 465 is mounted on the motor platform 422. This device is of conventional design, and has therefore not been illustrated in detail. It includes a built-in motor 467 which operates continuously whenever the apparatus 28 is in operation, and an encased speed reducing mechanism 469 driven by said motor. The output shaft 471 of the mechanism 469 rotates at a predetermined reduced rate of speed, which is approximately two revolutions per minute.

Rigidly secured to the projecting end of the output shaft 471, as best seen in Figure 8, is a first plate cam 473 the peripheral edge 475 of which is circular for approximately three hundred degrees, the remaining sixty degrees of said edge being extended to provide a lobe 477.

As will appear, this cam activates the master valve 44, which is of standard construction and will not therefore, be described in detail. It is mounted on motor platform 422 adjacent the right front corner thereof. The operating stem 480 of said valve is horizontally disposed, and suitable linkage 482 is provided for activating said stem in response to the rotary movements of cam 473. As shown in the drawings a roller 483 is included in the linkage 482, said roller being maintained in contact with the peripheral edge of cam 473 at all times by suitable means.

Numeral 481 indicates a second plate cam rigidly secured to the projecting end of the speed reducer output shaft 471. The peripheral edge 485 of this cam is circular for approximately two hundred and ninety degrees, the remaining seventy degrees of said edge being recessed to provide an indented portion 487, as seen to best advantage in Figure 9.

A conventional micro-switch 489 is attached to the underside of the platform 422. It includes a normally upwardly biased plunger 491 which supports a roller 493 in constant yielding engagement with the peripheral edge of the cam 481. The normal position of said plunger maintains the switch 489 open. Depression of said plunger, closes the switch, as is understood.

The automatic air control system is diagrammatically illustrated in Figure 10. For identification purposes in the description of operation to follow, reference numerals have been applied to the various conduits included in the system as follows: air pressure delivery line 482; trunk air lines 484 and 486; branch lines 490 and 492 in fluid communication with line 484; and branch lines 494, 496, and 498 in fluid communication with line 486.

*Operation*

It is understood that the containers C being delivered to the machine 69 via conveyor 60 contain the proper quantity of pasteurized cream at a temperature of 38 degrees Fahrenheit. It is also understood that the gas delivered to manifold 226 via line 256 is a mixture of approximately 85 per cent nitrous oxide, and 15 per cent carbon dioxide at approximately 90 pounds pressure.

Further, it is assumed that air under pressure, with valve 56 open, is being delivered to the master valve 44; that both conveyors 60 and 388 are simultaneously being driven longitudinally across the machine to the right; that motors 42 and 467 are not operating; that the position of cam 473 is such that lobe 477 is about to contact roller 483; and that the relative position of the cam 481 at this time is approximately as portrayed in Figure 9. In other words, it is here noted that the disposition of the lobe 477 of cam 473 relative to the indented portion 487 of cam 481 is such, that during each operating cycle, the micro-switch plunger 491 rises to open said switch and thus to de-energize the motor 42 immediately prior to the activation of the master valve 44 by the lobe 477 contact with roller 483.

The leading container C of the incoming row having reached the abutment 76, succeeding containers are brought into contiguous relation relative to one another, as the plate conveyor 60 slides beneath those which have become stationary, as is understood.

With the cam lobe 477 in the position indicated, air under pressure is being supplied via the master valve to conduit 484, and to the branches 490 and 492 thereof. Thus at this time, each of the piston rods 350, 110, and 164 is in its extended position. As a result, manifold 226 occupies the position shown for example in Figure 3; segmental gear 114 maintains the loading mechanism 32 in the position shown for example in Figure 3 also; and container guide plate 160 is being maintained in its elevated position.

As previously indicated, the machine illustrated is designed to process ten containers per cycle of operation. To this end, the ten arcuate recesses 140 of loader bar 138 are so spaced that each of them will engage a peripheral portion of one container C, when rocker arms 134 are caused to move from the full line to the broken line position thereof portrayed in Figure 4. Guide plates 158 and 160 maintain the ten containers in longitudinal alignment on conveyor 60.

It is here noted that a cycle is completed in approximately thirty seconds, so that the apparatus disclosed, when in continuous operation, will process twenty containers per minute. That is to say, cam 473 is so designed that reciprocatory agitation of the containers simultaneously with the injection thereinto of the gas, requires approximately twenty-five seconds, and loading operations require approximately five seconds.

Assuming now that a manually operable switch (not shown), is closed, the speed reducer motor 467 will be energized and will operate continuously so long as said switch remains closed. The output shaft 471 and the plate cams 473 and 481 thereon will rotate counterclockwise as viewed in Figures 1 and 9. Motor 42 however, and attention is directed to Figure 11, operates only when the plunger 491 is depressed.

Therefore, at the beginning of a cycle now to be described, cam lobe 477 engages roller 383 to move valve stem 480 to the left, which action cuts off the air pressure supply to conduit 484, and transfers it to conduit 486. As a result, air pressure is supplied via master valve 44 to said conduit 486, and to the branch lines 494, 496, and 498.

Consequently, each of the piston rods 350, 110, and 164 is withdrawn from its extended to its retracted position. In the course of a time elapse equivalent to five seconds, said piston rods, respectively associated with air cylinders 54, 50, and 52, raise manifold 226 to the position shown in broken lines in Figure 4; rotate segmental gear 114 to bring the loading mechanism 32 to the broken line position thereof shown in Figure 4; and retract or lower guide plate 160 to a position wherein its upper edge is slightly below the conveyor 60. While these operations are taking place, the indentation 487 of cam 481 is riding along roller 493 of the micro-switch 489, whereby the upwardly biased plunger 491 maintains said switch open so that motor 42 is inoperative.

Since all of these results are obtained in the space of about five seconds, the action would seem to be simultaneous. There is, however, a definite sequence in the action of said cylinders, and in this connection, reference to Figure 10 should be helpful.

The air system is so arranged that during the time motor 42 is inoperative, the following sequence of operations takes place: cylinder 54 causes manifold 226 to rise; while the latter is rising, cylinder 52 lowers the guide plate 160; and thereupon cylinder 50 activates the loading mechanism 32.

It is noted, as appears for example in Figure 4, that at this time, the upper surface of bed member 182 is horizontally disposed and flush with the upper surfaces of the conveyors 60 and 388. This result is obtained by the predetermined distribution of weight in the agitation mechanism. With reference for example to Figure 5, it is noted that the lower end portion 222 of the connecting rod is heavier than the upper end. It is also seen in Figure 7, that eccentric 456 is of greater diameter than the remainder of shaft 438. The free ends of the pivotally mounted arms 196, block 208 and so on, all tend to normally cause the bed member 182 to come to rest in its Figure 5 position, instantaneously after the micro-switch 489 opens.

Now as the loading mechanism 32 moves rearwardly, that is to the left as viewed in Figure 4, each of the recesses 140 of bar 138 engages one of the ten containers C whereby all ten of them are simultaneously transferred onto stationary bed plate 182. The stroke of arms 134 is definitely limited by the movement of piston rod 110, so that the containers C are moved from the full line position to the broken line position thereof, and no farther. To obviate longitudinal disalignment of the ten containers, the abutments 184, best seen in Figure 7, are provided.

Instantaneously following the completion of the loading stroke, cam lobe 477 passes beyond roller 483 whereupon valve stem 480 automatically moves to the right. This action cuts off the air supply to conduit 486, and transfers the pressure to conduit 484, whereupon in the order named, cylinder 54 lowers manifold 226 into the position shown for example in Figure 5; cylinder 52 raises the guide plate 160; and cylinder 50 simultaneously withdraws the loading mechanism 32. As the mechanism 32 is being withdrawn, the peripheral edge 485 of cam 481 contacts the roller 493 to close the micro-switch, thus energizing motor 42. That is to say, this motor becomes effective immediately after the recessed edge of loading bar 138 arrives at a position above conveyor 60.

The manner in which the air cylinders effect the movements thus far described, should be apparent from the drawings, but a brief description thereof will now be given. Thus, cylinder 54 alternately extends and withdraws its piston rod 350, to partially rotate clevis 354 in a counterclockwise, then in a clockwise direction. The limit of clevis travel in either direction is the same as that of the links 376, which are rigidly secured to rock shaft 364, as is said clevis. The actual raising and lowering of arms 228, and therefore of manifold 226, is by way of the levers 334. Cylinder 50 alternately extends and withdraws its piston rod 110 to rock the shaft 118 in a clockwise, then in a counterclockwise direction by means of rack 112 on the rod, and segmental gear 114 fixed to said shaft. This motion is transmitted to the arms 134, which are also fixed to shaft 118. Cylinder 52 alternately extends and withdraws its piston rod 164 to elevate and then lower guide plate 160.

Reverting now to that point in the operation at which the manifold 226 descends onto the ten containers aligned on the bed member, sealed fluid communication is established between said manifold and said containers, as described in detail and at length in the said Patent No. 2,594,492. As a result, gas under pressure is injected into each container.

At the precise moment that manifold 226 attains its downmost position, cam 481 depresses the micro-switch plunger 491 to start motor 42. Thereupon, rapid reciprocation of the ten containers is initiated and continues for approximately twenty-five seconds.

Thus the original turbulence engendered by injection of the gas is continued by the rapid reciprocation of the containers for that length of time. After the elapse of approximately twenty-five seconds, cam lobe 477 has again moved to a position wherein it is about to contact roller 483 thus completing the cycle of operations.

Apparently conveyor 60 has, during the reciprocating period, lined up another ten containers in preloading position, as the container C shown thereon in broken lines demonstrates in Figure 5. Now, as the cycle of operations previously explained is repeated, the ten containers aligned on said conveyor 60 are loaded onto bed member 132, displacing the processed containers which are simultaneously transferred to the discharge conveyor 388.

From the foregoing, it should be evident that the present invention provides novel means for controlling the reciprocating action of the apparatus disclosed in Patent No. 2,594,492 without requiring any changes in construction except the elimination of a clutch mechanism, the operating means therefor, and the incorporation in lieu thereof, of the structure described.

What I claim is:

1. In combination with apparatus of the character described including a machine for reciprocating a plurality of containers partially filled with a predetermined quantity of pasteurized cream simultaneously with the injection thereinto of a gas under predetermined pressure, a plate type conveyor for delivering said containers to the machine, a bed member normally flush with the upper surface of the conveyor, air cylinder operable mechanism for transferring a plurality of containers from said conveyor onto said bed member, gas injection mechanism including a sealed manifold whereon a plurality of injection assemblies is mounted, air cylinder operable mechanism for alternately lowering and elevating said manifold and the gas injection assemblies into and out of engagement respectively with the upper end of each of said containers, a rotatable shaft supported in spaced hanger bearings and having an eccentric portion integrally formed therewith, and a connecting rod the lower end of which is mounted on said eccentric portion and the upper end of which is pivotally connected to said bed member; a motor having a driving connection with said shaft for the intermittent rotation thereof; a continuously operating transmission and speed reducing unit; a first plate cam rigid with the projecting end of the output shaft of said unit for operating a master air valve; a micro-switch for controlling the energization and de-energization of said motor; and a second plate cam rigid with the projecting end of said output shaft for operating the micro-switch.

2. In combination with apparatus of the character described including a machine for reciprocating a plurality of containers partially filled with a predetermined quantity of pasteurized cream simultaneously with the injection thereinto of a gas under predetermined pressure, a plate type conveyor for delivering said containers to the machine, a bed member normally flush with the upper surface of the conveyor, air cylinder operable mechanism for transferring a plurality of containers from said conveyor onto said bed member, gas injection mechanism including a sealed manifold whereon a plurality of injection assemblies is mounted, air cylinder operable mechanism for alternately lowering and elevating said manifold and the gas injection assemblies into and out of engagement respectively with the upper end of each of said containers, a rotatable shaft supported in spaced hanger bearings and having an eccentric portion integrally formed therewith, and a connecting rod the lower end of which is mounted on said eccentric portion and the upper end of which is pivotally connected to said bed member; a motor having a driving connection with said shaft for rotating the latter intermittently to reciprocate said bed member; a continuously operating transmission and speed reducing unit the output shaft of which completes one revolution in approximately thirty seconds; a first plate cam secured to the projecting end of said output shaft for operating a master valve to control the air cylinder operable mechanism aforesaid; a micro-switch for controlling the energization and de-energization of said motor; and a second plate cam also secured to the projecting end of said output shaft for controlling the operation of said micro-switch.

3. In a machine for manufacturing whipped cream including a stationary frame, a horizontally disposed base plate supported on said frame, a horizontally disposed crankshaft rotatable in spaced hanger bearings mounted on the underside of said base plate, a horizontally disposed bed member for receiving and supporting a plurality of containers, a connecting rod passing through a circular opening in said base plate the lower end of said rod being mounted on the eccentric portion of said crankshaft and the upper end having a pivotal connection with said bed member, and a pair of composite transversely extending arms the rear ends of which are pivotally supported in spaced brackets rigidly mounted on said base plate and the free forward ends of which are secured to said bed member: an intermittently operable motor and a continuously operating combined transmission and speed reducer device also supported on said frame, the output shaft of said device rotating at a speed of approximately one revolution per thirty seconds; a driving connection between the motor and said crankshaft; a micro-switch for controlling the action of said intermittently operable motor; and a plate cam rigidly secured to the projecting end of the speed reducer output shaft for opening and closing said switch once during each revolution of said output shaft.

References Cited in the file of this patent

UNITED STATES PATENTS

| Number | Name | Date |
|---|---|---|
| 2,594,492 | Pfeiffer et al. | Apr. 29, 1952 |